United States Patent

Sakuma et al.

[11] Patent Number: 5,776,271
[45] Date of Patent: Jul. 7, 1998

[54] TIRE ANTI-SKID APPARATUS

[75] Inventors: Kiyoshi Sakuma; Tadashi Mituyasu, both of Tokyo, Japan

[73] Assignee: Car Mate Mfg. Co., Ltd., Tokyo, Japan

[21] Appl. No.: 764,152

[22] Filed: Dec. 12, 1996

[30] Foreign Application Priority Data

Dec. 13, 1995  [JP]  Japan ................... 7-346239

[51] Int. Cl.⁶ .................................................. B60C 27/12
[52] U.S. Cl. ................................................... 152/213 R
[58] Field of Search ................................ 152/221, 213 R

[56] References Cited

U.S. PATENT DOCUMENTS

D. 76,240   9/1928   Heltzel ............................. 152/221 X
1,185,084   5/1916   Gahan .............................. 152/221
1,662,262   3/1928   Gates ............................. 152/221 X
5,267,596  12/1993   Logar et al. ..................... 152/221 X

FOREIGN PATENT DOCUMENTS 2-21003   2/1990   Japan ......................... B60C 27/06
5-58921   8/1993   Japan ......................... B60C 27/10

Primary Examiner—Francis J. Lorin
Attorney, Agent, or Firm—Koda & Androlia

[57] ABSTRACT

A tire anti-skid apparatus including a plurality of non-metallic anti-skid members which are coupled at their side edges to an outer tightening member and to an inner tightening member via joints, the inner tightening member being in a form of a string comprised of stranded wires, and at least one of the anti-skid members being movable substantially parallel to the inner tightening member.

8 Claims, 5 Drawing Sheets

TIRE ANTI-SKID APPARATUS

BACKGROUND OF THE INVENTION

1. Field of the Invention

The present invention relates to a tire anti-skid apparatus, and in particular, to a non-metallic tire anti-skid apparatus that is installed on tires of a vehicle.

2. Prior Art

Conventional metallic tire anti-skid apparatuses or so-called tire chains includes a metallic connecting chain that fits on the tread surface of a tire, and the side edges of this connecting chain are connected to a metallic outer chain (an outer tightening member), which fits on the outer sidewall of the tire, and to a metallic inner chain (an inner tightening member), which fits on the inner sidewall of the tire. Accordingly, they are flexible in shape and are easily installable on tires of a vehicle without jacking up the vehicle or moving the tires on the chains spread on the ground beforehand.

One example of a conventional metallic tire anti-skid apparatus is disclosed in Japanese Utility Model Application Laid-Open No. 2-21003.

Japanese Patent Publication No. 5-58921 discloses one example of a non-metallic tire anti-skid apparatus.

FIG. 6 shows a conventional non-metallic tire anti-skid apparatus 2 installed on a tire 1. The tire 1 in FIG. 6 shows its outer sidewall which is the side visible when the tire is mounted on a vehicle (not shown).

The tire anti-skid apparatus 2 is comprised of a plurality of non-metallic anti-skid members 3 made from a synthetic resin or rubber, and these anti-skid members 3 are connected at their both ends to an outer tightening member 4. The outer connecting member 4 includes a lock member 5, which is variable in length, and hooks 6 coupling the tire outer ends of the anti-skid members 3.

In this conventional non-metallic tire anti-skid apparatus, however, the outer ends of each anti-skid member 3 are fixed directly by the hooks 6; therefore, the anti-skid apparatus cannot be easily deformed. In case that the anti-skid member 3 is a net, a vehicle must be jacked up or the tires must be moved onto the tire anti-skid apparatus spread on the ground beforehand in order to install the apparatus since the anti-skid member must uniformly cover the overall circumference of the tire.

SUMMARY OF THE INVENTION

Accordingly, a primary object of the present invention is to provide a tire anti-skid apparatus that is free from the disadvantages of the prior art apparatuses.

The object is accomplished by a unique structure for the tire anti-skid apparatus of the present invention that includes an outer tightening member, an inner tightening member and a plurality of anti-skid members made from non-metallic material and connected to the outer and inner tightening members, and one end of a joint is pivotally coupled to each of the outer and inner ends of at least one of the anti-skid members while the other end of the joint is pivotally coupled to the outer or inner tightening member.

Typically, the inner tightening member is made of stranded metallic wires, and the joint is ring-shaped or bar-shaped.

DETAILED DESCRIPTION OF THE PREFERRED EMBODIMENTS

Figure 1:
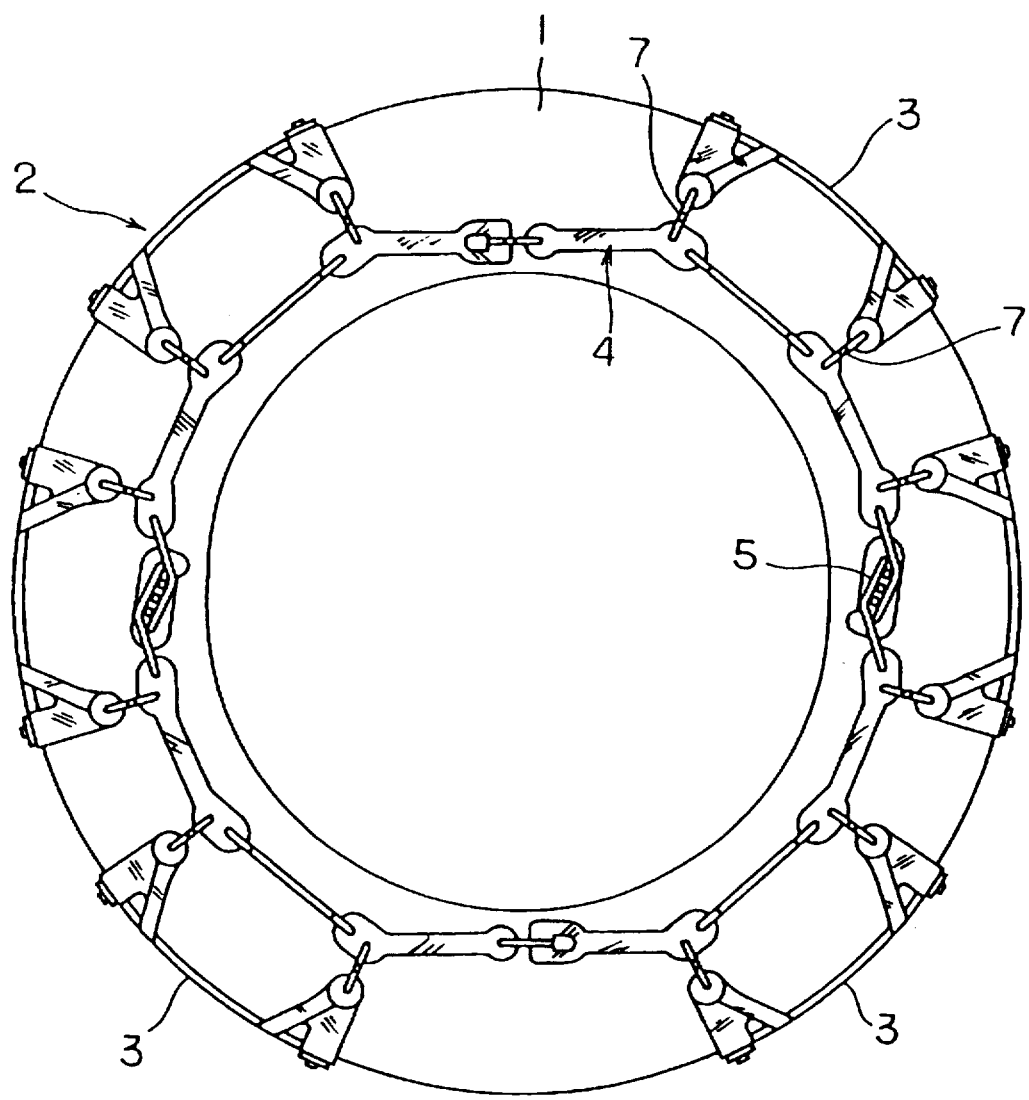
FIG. 1 shows a tire anti-skid apparatus according to the present invention mounted on a tire, the tire showing its outer side.
Figure 2:
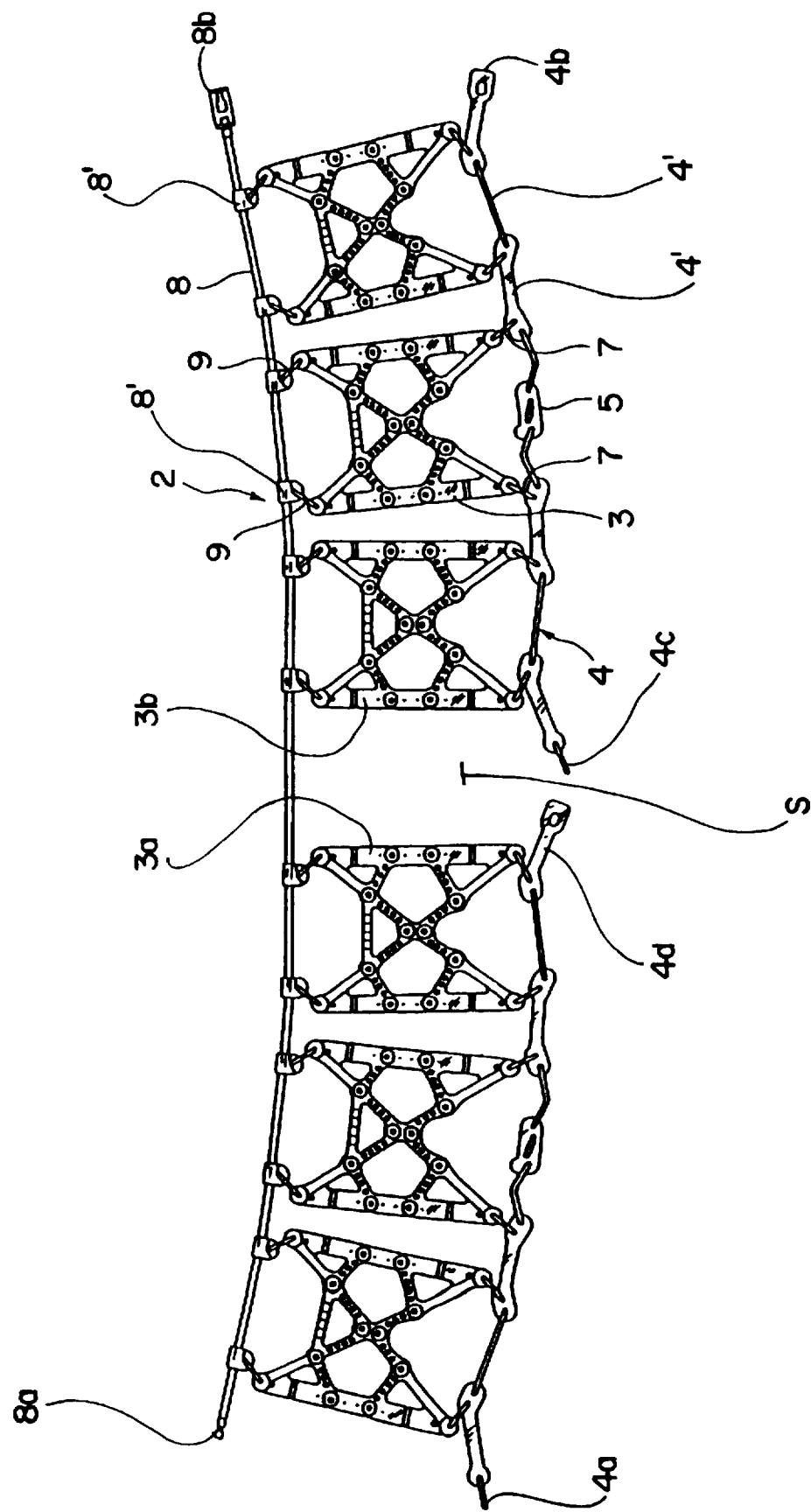
FIG. 2 shows the tire anti-skid apparatus according to the present invention mounted on a tire, the tire showing its inner side.

In the preferred embodiment of the present invention, a ring-shaped joint 7 is pivotally provided between outer ends of each one of a plurality of non-metallic anti-skid members 3 and an outer tightening member 4 so as to connect them as shown in FIGS. 1 and 2. The outer tightening member 4 includes a lock member 5 and link members 4'.

The anti-skid members 3 are arranged side by side as best shown in FIG. 2. Typically, six anti-skid members 3 are used, and they are arranged substantially in a linear fashion as shown in FIG. 2. A spaced area S is formed in the middle of the thus arranged anti-skid members 3, in other words between the anti-skid members 3a and 3b. In addition, an outside hook 4a is provided on the outer tightening member 4 located at one end of the anti-skid apparatus 2 and an outside hook-catch 4b is provided on the outer tightening member 4 located at another end thereof. Furthermore, an inside hook 4c and an inside hook-catch 4d are respectively provided on the anti-skid members 3 which form the spaced area S in between.

Figure 3:
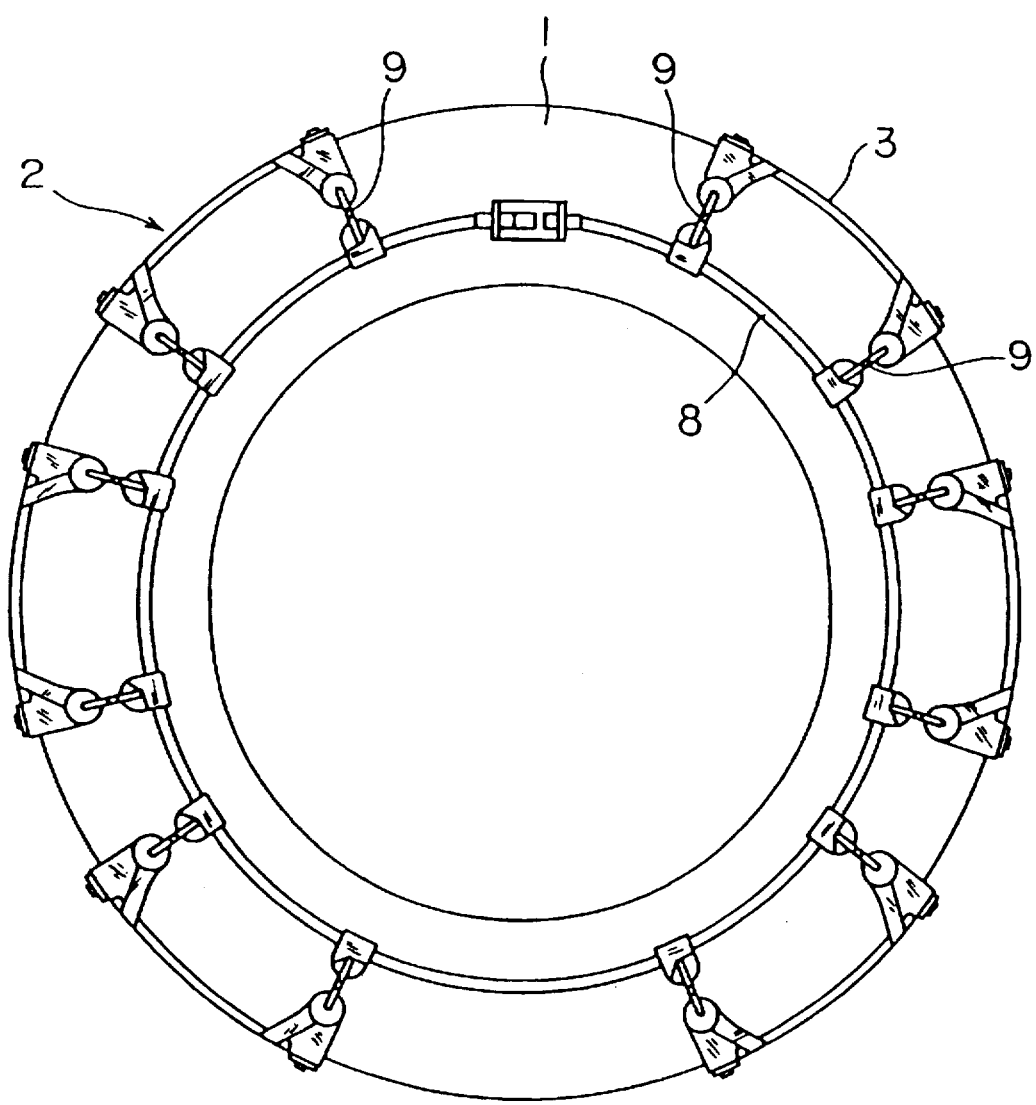
FIG. 3 shows the top view of the extended tire anti-skid apparatus.

The inner end of each non-metallic anti-skid members 3 and an inner tightening member 8 are connected by ring-shaped joints 9 which are pivotally provided between the anti-skid members 3 and the inner tightening member 8 as shown in FIGS. 2 and 3. The inner tightening member 8 is a string made of stranded metallic wires covered with a flexible tube member (not shown) and has about a 3 to 5 mm diameter. Thus, the inner tightening member 8 is easily deformable. In addition, the inner tightening member 8 is provided with a hook 8a and hook-catch 8b at its respective end.

Figure 4:
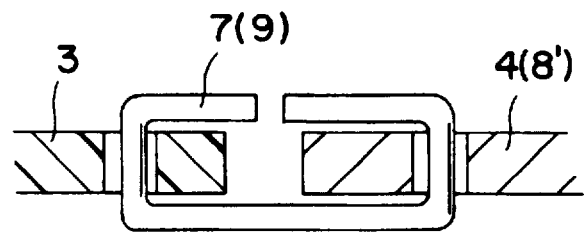
FIG. 4 shows a ring-shaped joint employed in the present invention.

FIG. 4 shows the detail of the ring-shaped joint 7 (or 9) connected to the anti-skid member 3 and the outer tightening member 4 (or the inner tightening member 8). Each joint 7(9) is loosely inserted into through holes formed in the anti-skid members 3 and in connecting plates 8' provided on the inner tightening member 8 and bent so as not come out of the through holes. Typically, the joints 7 and 9 are made of metal and the anti-skid members 3 are made of a synthetic resin, rubber, etc.

Since the tire anti-skid apparatus of the present invention is structured as described above, the anti-skid members 3, at least one anti-skid member 3, are laterally movable or shiftable in the direction shown by the arrow M in FIG. 2 with respect to the outer tightening member 4 and the inner tightening member 8 to the extent that the joints 7 and 9 can pivot. In other words, the anti-skid members 3 (at least one of them) can shift in the direction parallel to the inner tightening member 8.

Accordingly, when installing the anti-skid apparatus on a tire, the anti-skid members 3a and 3b are placed so that they are on the front and rear sides of the portion of a tire that is in contact with the ground and that such a portion is inside the spaced area S. Then, the hook 8a and the hook-catch 8b of the inner tightening member 8 are connected, and then the outside hook 4a and outside hook-catch 4b and also the inside hook 4c and the inside hook-catch 4d are respectively connected. Thus, the anti-skid apparatus 2 is installed on the tire with the anti-skid members 3 fitted on the tread surface of the tire and the outer tightening member 4 and the inner tightening member 8 fitted on both outer and inner sidewalls of the tire.

Thus, the tire anti-skid apparatus 2 is mounted easily on tires without jacking up the vehicle or moving the tires on the tire chains that are spread on the ground as in the prior art apparatuses. In other words, the anti-skid apparatus of the present invention can be installed easily and safely.

In addition, since the inner tightening member 8 is comprised of stranded metallic wires that have a great flexibility, the anti-skid apparatus 2 of the present invention is effortlessly mountable on tires.

Figure 5A:
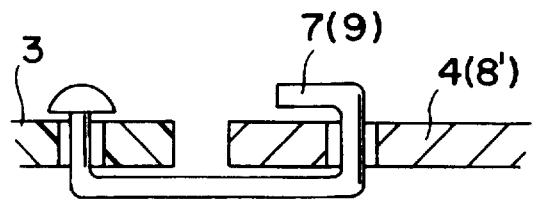
FIGS. 5(a) through 5(d) show bar-shaped joints used in the present invention.
Figure 5B:
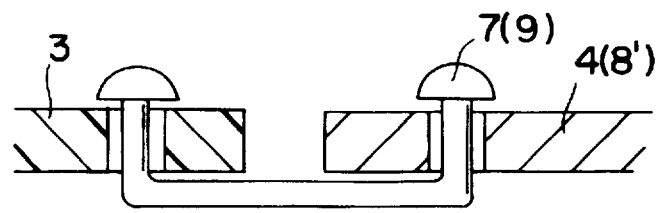
Figure 5C:
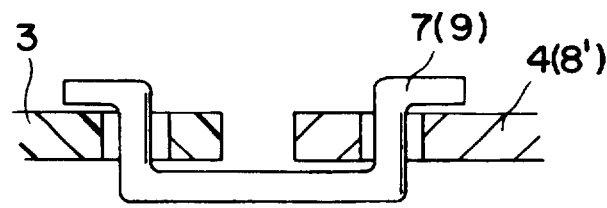
Figure 5D:
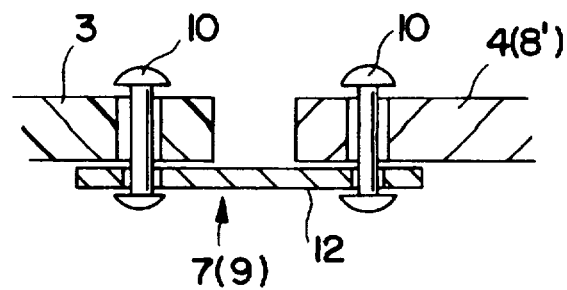
Figure 6:
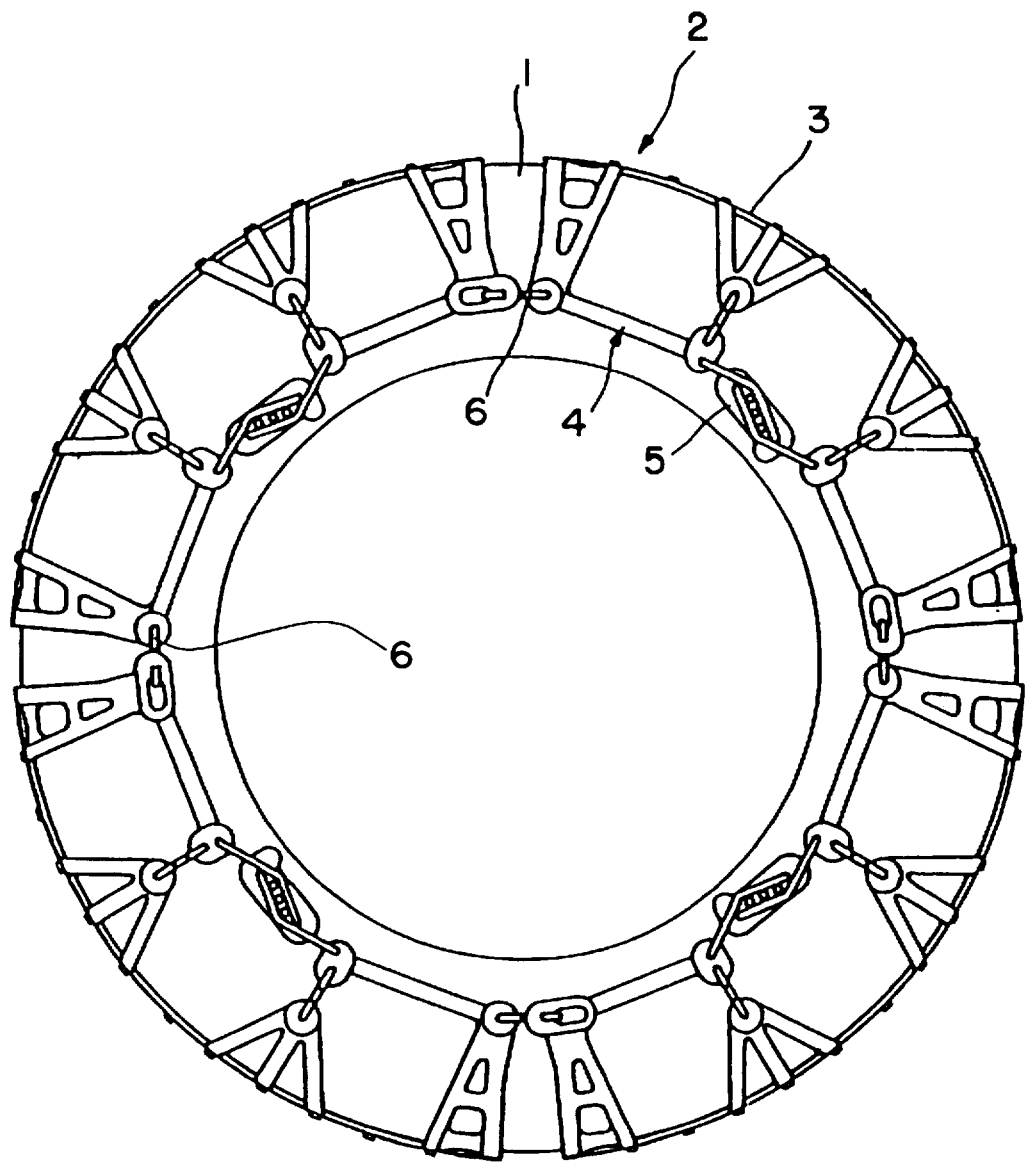
FIG. 6 is a front view of a conventional tire anti-skid apparatus mounted on a tire.

Instead of the ring-shaped joints 7 and 9, a bar-shaped joint can be used. FIGS. 5(a) through 5(c) show the different types of bar-shaped joints used in the present invention. The bar-shaped joints are metal bars loosely inserted into through holes formed in the anti-skid members 3 and in the tightening members 4(8) and bent fro 90 degrees at a few points thereon. The joint shown in FIG. 5(d) comprises a pair of rivets 10 connected by a connecting plate 12. When these bar-shaped joints are used, one end of the bar-shaped joint is, like in the ring-shaped joints, pivotally coupled to the outer or inner end of the anti-skid member 3 while the other end of the bar-shaped joint is pivotally coupled to the outer tightening member 4 or the inner tightening member 8.

In the present invention, as long as at least one anti-skid member 3 is movable relative to the outer tightening member 4 and the inner tightening member 8, the other anti-skid members 3 can be fixed to be immovable along the inner tightening member 8.

As seen from the above, according to the present invention, the tire anti-skid apparatus can be installed as easily as with metallic tire anti-skid apparatuses; and it is possible to form the anti-skid member from a net-form component.

We claim:

1. A tire anti-skid apparatus comprising a tire outer tightening device, a tire inner tightening device, and a plurality of non-metallic anti-skid members coupled between said tire outer tightening member and said tire inner tightening device, wherein said plurality of non-metallic anti-skid members are separated into a plurality of groups with a space between said plurality of groups, and one end of a joint is pivotally coupled to an outer end of at least one of said plurality of anti-skid members while another end of said joint is pivotally coupled to said outside tightening member and one end of another joint is pivotally coupled to an inner end of said at least one of said plurality of anti-skid members while another end of said another joint is pivotally coupled to said inner tightening member.

2. A tire anti-skid apparatus according to claim 1 wherein said inner tightening member is made of stranded metallic wires.

3. A tire anti-skid apparatus according to claim 1 or 2 wherein said joint is a ring-shaped joint.

4. A tire anti-skid apparatus according to claim 1 or 2 wherein said joint is a bar-shaped joint.

5. A tire anti-skid apparatus comprising a first tightening member, a second tightening member, and a plurality of non-metallic anti-skid members provided between said first tightening member and said second tightening member, wherein said plurality of non-metallic anti-skid members are separated into two groups with a space between said two groups, and at least one of said non-metallic anti-skid members of each of said two groups is coupled to said first and second tightening members via joints which are pivotally connected to said at least one of said non-metallic anti-skid members and to said first and second tightening members so that at least one of said anti-skid members of each of said two groups is shiftable substantially parallel to one of said first and second tightening members.

6. A tire anti-skid apparatus according to claim 5 wherein said inner tightening member is made of stranded metallic wires.

7. A tire anti-skid apparatus according to claim 5 wherein each of said joints is a metal ring.

8. A tire anti-skid apparatus according to claim 5 wherein each of said joints is a metallic bar-shaped joint.

* * * * *